United States Patent Office 3,558,487
Patented Jan. 26, 1971

3,558,487
DRILLING FLUID ADDITIVES
Charles A. Stratton, Copan, Okla., assignor to Phillips Petroleum Company, a corporation of Delaware
No Drawing. Filed Dec. 31, 1963, Ser. No. 334,906
Int. Cl. C10m 3/34
U.S. Cl. 252—8.5
17 Claims

ABSTRACT OF THE DISCLOSURE

Improved well drilling fluids containing a small but effective amount of a thinning agent selected from the group consisting of certain sulfonated polyhydric phenols and certain sulfonated polyhydric naphthols capable of being oxidized to a quinone, certain metal salts of said phenols and said naphthols, and oxidation products obtained upon oxidation of said phenols, said naphthols, and said metal salts of said phenols and said naphthols; and methods of drilling a well using said drilling fluids.

---

This invention relates to drilling fluids and additives therefor. In one aspect this invention relates to controlling the rheological properties of drilling fluids. In another aspect this invention relates to additives for controlling the rheological properties of drilling fluids. In another aspect this invention relates to a drilling fluid having controlled rheological properties. In another aspect this invention relates to a method for drilling wells employing said drilling fluids.

In the art of drilling wells to tap subterranean deposits of fluids such as oil and/or gas, especially when drilling by the rotary method employing a rotary bit and drill stem, a drilling fluid, usually a compounded fluid made to predetermined physical and chemical properties, is circulated to the bottom of the bore hole, out through openings in the bit at the bottom of the bore hole, and then back up said bore hole to the surface by passage through the annular space between said drill stem and the wall of said bore hole (or between said drill stem and the wall of the casing where casing has been put in place). "Reverse" circulation as where the drilling fluid is circulated down through said annulus and back up through the drill stem is also sometimes practiced.

The drilling fluid must act as a liquid medium of controlled viscosity for removing cuttings from the bore hole; it must prevent excessive amounts of fluid from flowing from the bore hole into surrounding formations by depositing on the wall of the hole a thin but substantially impervious filter cake; it must possess a gel structure of sufficient strength to hold in suspension solids, particularly during any time the fluid is not circulating; it must serve as a weighting material exerting sufficient pressure to counterbalance any pressure exerted by water, gas, oil, or other fluid from a penetrated structure and to prevent caving or other intrusion into the drill hole.

One of the difficulties encountered in drilling with water base drilling fluids is the undesirable increase in viscosity and gel strengths brought about by contamination of the drilling fluid with materials from the formations penetrated. Various materials have been proposed for use in controlling viscosity and gel strengths of drilling fluids during drilling operations. However, these materials are not always completely satisfactory for one reason or another and there is a continuing search for other materials which will prevent undesired viscosity increase, or will reduce the viscosity of a drilling fluid.

In formulating drilling fluids it is desirable that the drilling fluid have a pH greater than 7 so as to minimize or eliminate corrosion problems. It is common practice to use caustic (sodium hydroxide) for this purpose, when necessary. This frequently creates difficulties because the drilling fluid will usually contain a quantity of suspended solids in the form of clay or clayey material including some quantity of colloidal clay such as bentonite. Drilling fluids containing bentonitic clays or other clay-like or clayey materials demonstrate a pronounced thickening when the pH is increased in the absence of a thinning agent or additive. In some systems the thickening is extreme and the drilling fluid is rendered so thick that it cannot be utilized.

The present invention provides a solution for the above-described problems by providing an effective thinning additive or agent. I have now discovered that the rheological properties of water-base drilling fluids can be controlled by incorporating therein certain sulfonated polyhydric compounds or materials, or oxidation products thereof (all defined further hereinafter). Said drilling fluids can also contain the usual clays or clayey materials, weighting agents, etc. which are commonly used in drilling muds of this type according to the prior art.

Thus, broadly speaking, the present invention resides in a drilling fluid having controlled or improved rheological properties and comprising water, suspended solids, and as an additive, certain sulfonated polyhydric compounds or materials or oxidation products thereof (all defined further hereinafter), said additive being present in a small but effective amount sufficient to improve or control the rheological properties of said drilling fluid, and methods of using said drilling fluids in wells. If desired, mixtures of said additives can be used in the practice of the invention.

An object of this invention is to provide an improved drilling fluid. Another object of this invention is to provide a drilling fluid having controlled and/or improved rheological properties. Another object of this invention is to provide an additive for use in a water-base drilling fluid which is effective in controlling and/or improving the rheological properties of said drilling fluid. Still another object of this invention is to provide methods of using said improved drilling fluids in the drilling or workover of wells. Another object of this invention is to provide a method of drilling and/or completing a well in which method a drilling fluid of the invention is circulated in said well. Other aspects, objects, and advantages of the invention will be apparent to those skilled in the art in view of this disclosure.

Thus, according to the invention, there is provided a water-base well drilling fluid comprising: sufficient water to maintain the mixture fluid; sufficient suspended solids to form a filter cake on the wall of the well; a sufficient amount of an alkali metal hydroxide to maintain the drilling fluid alkaline; and a small but effective amount, sufficient to improve the rheological properties of said fluid, of an additive selected from the group consisting of (a) a sulfonated polyhydric phenol, capable of being oxidized to a quinone, and having the formula

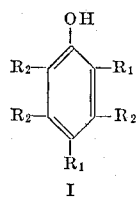

(b) a sulfonated polyhydric naphthol, capable of being oxidized to a quinone, and having the formula

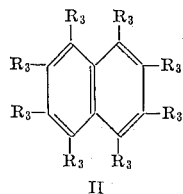

wherein: in said Formula I and said Formula II each $R_1$, each $R_2$, and each $R_3$ substituent is selected from the group consisting of a hydrogen atom, —OH, —SO$_3$H, and —COOH radicals, and alkyl groups containing from 1 to 18 carbon atoms; in Formula I at least one $R_1$ substituent is —OH, and of all the remaining $R_1$ and $R_2$ substituents at least one and not more than three is —SO$_3$H; in Formula II, at least two and not more than four $R_3$ substituents are —OH radicals with at least two of said —OH radicals being in positions which will permit the formation of a quinone upon oxidation of the compound, at least one and not more than three $R_3$ substitutents is —SO$_3$H, and not more than three $R_3$ substitutents are —COOH; and the total number of carbon atoms in said alkyl groups is not more than 24, (c) the corresponding quinone obtained upon oxidation of said phenol, (d) intermediate oxidation products obtained upon oxidation of said phenol, (e) the ammonium, alkali metal, and alkaline earth metal salts of said phenol, (f) the corresponding quinone obtained upon oxidation of said salts of said phenol, (g) intermediate oxidation products obtained upon oxidation of said salts of said phenol, (h) the corresponding quinone obtained upon oxidation of said naphthol, (i) intermediate oxidation products obtained upon oxidation of said naphthol, (j) the ammonium, alkali metal, and alkaline earth metal salts of said naphthol, (k) the corresponding quinone obtained upon oxidation of said salts of said naphthol, (l) intermediate oxidation products obtained upon oxidation of said salts of said naphthol, and (m) mixtures thereof.

Further according to the invention, there are provided methods of using the improved drilling fluids of the invention, which methods comprise circulating said drilling fluids into and from the bore hole in contact with the walls of said bore hole.

The above-described thinning agents or additives which are utilized in the practice of the invention are preferably those which are soluble in the water phase of the drilling fluid. However, as discussed further hereinafter, the invention is not limited to the water soluble additives. It is sufficient if the additive can be readily dispersed in the water phase of the drilling fluid in any suitable manner. Examples of the above-described additives which can be used in the practice of the invention include, among others, the following: 2,3-dihydroxybenzenesulfonic acid; 3,4-dihydroxybenzenesulfonic acid; 2,5-dihydroxybenzenesulfonic acid; 3,4-dihydroxy-1-naphthalenesulfonic acid; 5,8-dihydroxy-2-naphthalenesulfonic acid; 4,8-dihydroxy-2-naphthalenesulfonic acid; 4,6-dihydroxy-2-naphthalenesulfonic acid; 6,7-dihydroxy-2-naphthalenesulfonic acid; 3,7-dihydroxy-1-naphthalenesulfonic acid; 2,5-dihydroxy-p-toluenesulfonic acid; lithium salt of 4,5-dihydroxy-2-ethylbenzenesulfonic acid; sodium salt of 4-carboxy-2,5-dihydroxybenzenesulfonic acid; 2,5-dihydroxy-1,3,4-benzenetrisulfonic acid; ammonium salt of 2,5-dihydroxy-3,4,6-tricarboxybenzenesulfonic acid; potassium salt of 4,5-dihydroxy-2-octadecylbenzenesulfonic acid; calcium salt of 2,5-dihydroxy-6-isobctyl-4-pentyl-3-pentadecylbenzenesulfonic acid; sodium salt of 4,5-dihydroxy-m-benzenedisulfonic acid; potassium salt of 2,5-dihydroxybenzenesulfonic acid; sodium salt of 6,7-dihydroxy-2-naphthalenesulfonic acid; sodium salt of 4,6-dihydroxy-2-naphthalenesulfonic acid; 3,4-dihydroxy-6-methyl-1-naphthalenesulfonic acid; calcium salt of 5,8-dihydroxy-7-octadecyl-2-naphthalenesulfonic acid; potassium salt of 1,5-dihydroxy-4-isopropyl-8-nonyl-7-dodceyl-2-naphthalenesulfonic acid; barium salt of 1,7-dihydroxy-2,4,6-naphthalenetrisulfonic acid; rubidium salt of 6,7-dihydroxy-3,4,5-tricarboxy-1-naphthalenesulfonic acid; strontium salt of 3,4,6,7-tetrahydroxy-2-naphthalenesulfonic acid; cesium salt of 3-carboxy-7,8-dihydroxy-5-ethyl-1-naphthalenesulfonic acid; potassium salt of sulfo-p-benzoquinone; sodium salt of 3,5-disulfo-o-benzoquinone; sodium salt of 6-sulfo-2,3-naphthoquinone; 2-carboxy-5-sulfo-p-benzoquinone; calcium salt of 7-methyl-6-sulfo-1,2-naphthoquinone; lithium salt of 2-hexyl-8-octadecyl-6-sulfo-1,4-naphthoquinone; ammonium salt of 2,4,7-trisulfo-1,5-naphthoquinone; barium salt of 5-carboxy-4-sulfo-1,7-naphthoquinone; 4-sulfo-2,6-naphthoquinone; sulfoquinhydrone; 4-sulfo-2,6-naphthoquinhydrone; semiquinone radical obtainable by the oxidation of 2,5-dihydroxybenzenesulfonic acid; semiquinone radical obtainable by the oxidation of 3,7-dihydroxy-1-naphthalenesulfonic acid; semiquinone radical-anion obtainable by the oxidation of the sodium salt of 2,5-dihydroxybenzenesulfonic acid; semiquinone radical-anion obtainable by the oxidation of the calcium salt of 4,6-dihydroxy-2-naphthalenesulfonic acid; and the like.

Even when the compound added to the drilling fluid in accordance with the invention is one of the sulfonated polyhydric phenols, one of the sulfonated polyhydric naphthols, or a salt of one of said phenols and naphthols, one or more of the oxidation products thereof including the sulfonated quinhydrone, the sulfonated semiquinone radical, the sulfonated semiquinone radical-anion, and the sulfonated quinone may form in situ because, as is well known, the drilling fluid is usually open to the atmosphere while in the mud pits or tanks at the surface of the earth and can absorb and/or entrap considerable quantities of air. Said oxidation products have been found to be effective additives in accordance with the invention. Thus, one or more of said oxidation products per se can be the additive material added to the drilling fluid.

The amount of the above-described additives of the invention used in the drilling fluids in accordance with the invention will vary from well to well depending upon conditions encountered in the drilling of the well, the characteristics of the particular drilling fluid being used, the formation being drilled, etc. In general, the amount of additive used will be an amount sufficient to improve and/or control the rheological properties of the drilling fluid. The amount of additive used will be an amount which is at least sufficient to maintain the viscosity of the drilling fluid low enough so that it can be circulated. While therefore the amount of said additive used is not of the essence of the invention, it can be stated that the amount used will normally be within the range of about 0.05 to 10, preferably 0.2 to 5 pounds per barrel of drilling fluid. However, it is within the scope of the invention to employ amounts of said additives which are outside said ranges. As used herein and in the claims, unless otherwise specified, the word "barrel" refers to a barrel of 42 standard U.S. gallons.

Since water-base drilling muds or fluids must plaster the walls of the well and prevent loss of water to the formations penetrated as well as perform the functions already described, a number of ingredients must be used. Ordinarily, a sufficient amount of suspended solids is added in the form of clay along with a smaller amount of a colloidal type clay, such as bentonite, to form a filter cake on the wall of the well. To prevent the loss of water to the formations by filtration through the filter cake, the usual practice is to add a small amount, from 1 to 4 pounds per barrel of mud, of water loss reducing agents. Examples of these agents are sodium carboxymethylcellulose, cellulose acid sulfate, metal cellulosealkyl sulfonates, and sodium oxycellulose.

The drilling fluids of the invention can contain other additives when required to adjust the properties of the drilling fluids in accordance with conventional practice. Thus, it will be understood that other additives can be added to the drilling fluids of this invention without departing from the scope of the invention. Special materials are oftentimes added to drilling fluids for particular purposes, and such additional materials can be employed in the drilling fluids of this invention, providing a usual and conventional test indicates a lack of obvious adverse reactions, and such additional additives are applicable in the drilling fluids of this invention with few, if any, exceptions.

The additives of the invention can be incorporated in the drilling fluid in several ways. A convenient practice is to incorporate said additives in the drilling fluid after the drilling operations have started. Many of the additives of the invention can be incorporated in the drilling fluid by merely adding same to a stream of the circulating drilling fluid. When the additive is water soluble it can, if desired, be predissolved in water and the water solution added to the drilling fluid. The incorporation of the additives of the invention into the drilling fluid can either be before or during the drilling of the well. Thus, said additives can be incorporated in the drilling fluid in any suitable manner.

For best operation, the pH of drilling fluids formulated in accordance with the invention should be sufficiently high that any phenolic hydroxyl groups, as well as other more acidic groups, are present in their salt forms. Thus, the pH of the drilling fluid is preferably greater than 7, more preferably greater than about 9, and still more preferably greater than about 11. When required, the pH of the drilling fluid can be increased by the addition thereto of a sufficient amount of an alkali metal hydroxide. As used herein and in the claims, unless otherwise specified, the term "alkali metal" includes sodium, potassium, lithium, rubidium, and cesium.

The following examples will serve to further illustrate the invention.

EXAMPLE I

To a base drilling fluid consisting of 6 weight percent bentonite in water there was added a sufficient amount of the disodium salt of 4,5-dihydroxy-m-benzenedisulfonic acid to give a concentration of 0.5 pound of additive per barrel of drilling fluid. The pH of each of four samples of the resulting drilling fluid was adjusted with a solution containing 0.5 gram of sodium hydroxide per ml. Each sample was then stirred for 15 minutes with a Hamilton Beach stirer and then tested. The apparent viscosity, plastic viscosity, yield point, initial gel strength, and 10-minute gel strength were determined by recommended API methods employing a Model 35 Fann V-G Meter (a direct-indicating viscosimeter). The base drilling fluid without additive was used in a control test. The results, set forth in Table I below, show that the use of the disodium salt of 4,5-dihydroxy-m-benzenedisulfonic acid provides a drilling fluid of substantially improved yield point and gel strength and prevents the undesirable increase in gel strengths and viscosities which would normally have occurred with increasing concentration of caustic.

TABLE I

| | Run Number | | | | |
|---|---|---|---|---|---|
| | Control | 1 | 2 | 3 | 4 |
| Additive, lb./bbl | 0 | 0.5 | 0.5 | 0.5 | 0.5 |
| NaOH, lb./bbl | 0 | 0.05 | 0.125 | 0.25 | 0.375 |
| pH | 8.7 | 9.4 | 9.8 | 10.9 | 11.4 |
| Apparent viscosity, cp | 27 | 23 | 23 | 25 | 27 |
| Plastic viscosity, cp | 14 | 14 | 14 | 19 | 21 |
| Yield point, lb./100 ft.$^2$ | 26 | 17 | 18 | 12 | 11 |
| Initial gel, lb./100 ft.$^2$ | 27 | 6 | 12 | 2 | 5 |
| 10 minutes gel, lb./100 ft.$^2$ | 42 | 34 | 35 | 34 | 47 |

EXAMPLE II

To a base drilling fluid consisting of 6 weight percent bentonite in water there was added a sufficient amount of the sodium salt of 6,7-dihydroxy-2-naphthalenesulfonic acid to give a concentration of 0.5 pound of additive per barrel of drilling fluid. The pH of each of four samples of the resulting drilling fluid was adjusted with a solution containing 0.5 gram of sodium hydroxide per ml. Each sample was then stirred for 15 minutes with a Hamilton Beach stirrer and then tested. The apparent viscosity, plastic viscosity, yield point, initial gel strength, and 10-minute gel strength were determined by the methods employed in Example I. The results, set forth in Table II below, show the improved yield point and gel strength obtained by use of the sodium salt of 6,7-dihydroxy-2-naphthalenesulfonic acid. The control test shown in Example I is repeated for comparison purposes. Again, the additive of the invention prevented the undesirable increase in gel strengths and viscosities which would have occurred in the absence of the additive.

TABLE II

| | Run Number | | | | |
|---|---|---|---|---|---|
| | Control | 1 | 2 | 3 | 4 |
| Additive, lb./bbl | 0 | 0.5 | 0.5 | 0.5 | 0.5 |
| NaOH, lb./bbl | 0 | 0.02 | 0.05 | 0.10 | 0.25 |
| pH | 8.7 | 8.0 | 8.4 | 9.9 | 10.5 |
| Apparent viscosity, cp | 27 | 24 | 24 | 23 | 23 |
| Plastic viscosity, cp | 14 | 14 | 13 | 15 | 17 |
| Yield point, lb./100 ft.$^2$ | 25 | 19 | 21 | 16 | 11 |
| Initial gel, lb./100 ft.$^2$ | 27 | 21 | 22 | 15 | 8 |
| 10 minutes gel, lb./100 ft.$^2$ | 42 | 27 | 32 | 35 | 37 |

EXAMPLE III

Another base drilling fluid consisting of 6 weight percent bentonite in water was prepared. The pH of each of four samples of said drilling fluid was adjusted with a solution containing 0.5 gram of sodium hydroxide per ml. To another sample of said drilling fluid there was added a sufficient amount of the disodium salt of 4,5-dihydroxy-m-benzenedisulfonic acid to give a concentration of 0.5 pound of additive per barrel of drilling fluid. The pH of said last-mentioned sample was also adjusted with said sodium hydroxide solution. Each sample was then stirred for 15 minutes with a Hamilton Beach stirrer and then tested according to the methods set forth in Example I. The results of said tests, including tests on a control sample of said drilling fluid are set forth in Table III below.

TABLE III

|  | Run Number | | | | | |
| --- | --- | --- | --- | --- | --- | --- |
|  | Control | 1 | 2 | 3 | 4 | 5 |
| Additive, lb./bbl | 0 | 0 | 0 | 0 | 0 | 0.5 |
| NaOH, lb./bbl | 0 | .05 | 0.125 | 0.25 | 0.375 | 0.25 |
| pH | 8.7 | 9.7 | 10.5 | 11.0 | 12.0 | 10.8 |
| Apparent viscosity, cp | 67 | 74 | 98 | (1) | (1) | 55 |
| Plastic viscosity, cp | 35 | 41 | 57 | (1) | (1) | 32 |
| Yield point, lb./100 ft.² | 65 | 65 | 82 | (1) | (1) | 40 |
| Initial gel, lb./100 ft.² | 26 | 56 | 77 | (1) | (1) | 7 |
| 10 minutes gel, lb./100 ft.² | 67 | 108 | 150 | (1) | (1) | 56 |

¹ Thick.

The bentonite used in the above runs of Example III was from a different lot of bentonite than that used in Examples I and II. However, the results obtained illustrate the typical thickening which is obtained when the pH of drilling fluids containing bentonite or bentonitic clays is increased. The results of Run No. 5 show that the additive of the invention was effective in preventing said thickening. The bentonites used in Examples I, II, and III were a field grade of Wyoming bentonite.

EXAMPLE IV

Another base drilling fluid consisting of 5 weight percent bentonite in water was prepared. The bentonite used was a purified material prepared from a Wyoming bentonite by centrifuging a water suspension thereof to remove sand, silt, etc., and spray drying the bentonite suspension recovered from the centrifuging. The pH of each of three samples of said base drilling fluid was adjusted with a solution containing 0.5 gram of sodium hydroxide per ml. Each sample was then stirred for 15 minutes with a Hamilton Beach stirrer. The samples were then tested in the manner described in Example I. The results of said tests, set forth as Runs 1, 2, and 3 in Table IV below, are another illustration of the thickening which is obtained when the pH of drilling fluids containing bentonite or bentonitic clays is increased.

EXAMPLE V

To 25 grams of the sodium salt of 6,7-dihydroxy-2-naphthalenesulfonic acid and 15.3 ml. of an aqueous solution containing 0.5 gram of sodium hydroxide per ml. was added approximately 200 ml. of water. To effect oxidation of the sulfonate, air was blown through the solution for 64 hours. Water lost through evaporation was replenished as required during the oxidation process. Oxidation occurred as evidenced by the change in color of the solution from clear and transparent to black and opaque. The water was then evaporated from the solution under vacuum, and the solid residue was pulverized. The pulverized oxidation product was a dark olive-drab in color. This solid oxidation product was then evaluated as a drilling fluid additive using samples of the base drilling fluid of Example IV. The drilling fluid samples containing said oxidation product additive were prepared and tested in the manner described in Example I. The results of these evaluation tests are set forth in Table IV below as Runs 4, 5, 6, and 7. The data show that said oxidation product is an effective additive for controlling the rheological properties of water-base drilling fluids.

TABLE IV

|  | Run number | | | | | | | |
| --- | --- | --- | --- | --- | --- | --- | --- | --- |
|  | Control | 1 | 2 | 3 | 4 | 5 | 6 | 7 |
| Additive and Example | | (¹) | (¹) | (¹) | (²) | (²) | (²) | (²) |
| Additive, lb./bbl | 0 | 0 | 0 | 0 | 0.55 | 0.55 | 0.55 | 0.55 |
| NaOH, lb./bbl | 0 | 0.025 | 0.075 | 0.125 | 0 | 0.025 | 0.075 | 0.175 |
| pH | 8.7 | 9.4 | 10.4 | 11.0 | 8.6 | 9.1 | 9.9 | 11.0 |
| Apparent viscosity, cp | 50 | 53 | 86 | 110 | 44 | 44 | 33 | 29 |
| Plastic viscosity, cp | 21 | 10 | 25 | 75 | 19 | 20 | 18 | 21 |
| Yield point, lb./100 ft.² | 57 | 85 | 102 | 70 | 50 | 48 | 30 | 15 |
| Initial gel, lb./100 ft.² | 45 | 60 | 93 | 84 | 36 | 41 | 25 | 3 |
| 10 minutes gel, lb./100 ft.² | 67 | 105 | 183 | 196 | 67 | 75 | 62 | 33 |

¹ None—Example IV.
² Oxidation Product—Example V.

EXAMPLE VI

The additive of the invention evaluated in Example I, i.e., the disodium salt of 4,5-dihydroxy-m-benzenedisulfonic acid, was also evaluated in a base drilling fluid consisting of 5 weight percent of bentonite in water. The bentonite used was that described in Example IV above. The evaluation was carried out in the manner described in Example I. The results of this evaluation are set forth as Runs 1, 2, 3, and 4 in Table V below. The data show said additive is an effective thinning agent in this drilling fluid also.

EXAMPLE VII

The additive of the invention evaluated in Eaxmple II, i.e., the sodium salt of 6,7-dihydroxy-2-naphthalenesulfonic acid, was also evaluated in a base drilling fluid consisting of 5 weight percent of bentonite in water. The bentonite used was that described in Example IV above. The evaluation was carried out in the manner described in Example II. The results of this evaluation are set forth as Runs 5, 6, 7, and 8 in Table V below. The data show said additive is an effective thinning agent in this drilling fluid also.

TABLE V

|  | Run number | | | | | | | | |
| --- | --- | --- | --- | --- | --- | --- | --- | --- | --- |
|  | Control | 1 | 2 | 3 | 4 | 5 | 6 | 7 | 8 |
| Additive, name | | (¹) | (¹) | (¹) | (¹) | (²) | (²) | (²) | (²) |
| Additive, lb./bbl | 0 | 0.5 | 0.5 | 0.5 | 0.5 | 0.5 | 0.5 | 0.5 | 0.5 |
| NaOH, lb./bbl | 0 | 0 | 0.075 | 0.125 | 0.175 | 0 | 0.075 | 0.125 | 0.175 |
| pH | 8.7 | 7.8 | 9.5 | 10.5 | 11.1 | 7.8 | 9.2 | 10.2 | 11.0 |
| Apparent viscosity, cp | 50 | 38 | 35 | 28 | 26 | 42 | 39 | 28 | 26 |
| Plastic viscosity, cp | 21 | 16 | 18 | 19 | 19 | 16 | 17 | 18 | 19 |
| Yield point, lb./100 ft.² | 57 | 43 | 33 | 18 | 14 | 52 | 44 | 20 | 14 |
| Initial gel, lb./100 ft.² | 45 | 31 | 26 | 4 | 3 | 36 | 34 | 11 | 3 |
| 10 minutes gel, lb./100 ft.² | 67 | 48 | 58 | 46 | 36 | 48 | 63 | 57 | 36 |

¹ 4,5-dihydroxy-m-benzenedisulfonic acid (disodium salt).
² 6,7-dihydroxy-2-naphthalenesulfonic acid (sodium salt).

While certain embodiments of the invention have been described for illustrative purposes, the invention obviously is not limited thereto. Various other modifications will be apparent to those skilled in the art in view of this disclosure. Such modifications are within the spirit and scope of the invention.

I claim:

1. A water-base well drilling fluid comprising: sufficient water to maintain the mixture fluid; sufficient suspended solids to form a filter cake on the wall of the well; a sufficient amount of an alkali metal hydroxide to maintain the drilling fluid alkaline; and a small but effective amount, sufficient to maintain the viscosity of the drilling fluid low enough so that it can be circulated, of an additive selected from the group consisting of (a) a sulfonated polyhydric naphthol, capable of being oxidized to a quinone, and having the formula

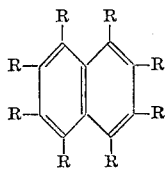

wherein: each R substituent is selected from the group consisting of a hydrogen atom, —OH, —SO$_3$H, and —COOH radicals, and alkyl groups containing from 1 to 18 carbon atoms; at least two and not more than four R substituents are —OH radicals with at least two of said —OH radicals being in positions which will permit the formation of a quinone upon oxidation of the compound; at least one and not more than three R substituents is —SO$_3$H; not more than three R substituents are —COOH; and the total number of carbon atoms in said alkyl groups is not more than 24;

(b) quinhydrone, semiquinone, and quinone oxidation products obtained upon oxidation of said naphthol;

(c) the ammonium, the alkali metal, and the alkaline earth metal salts of said naphthol;

(d) quinhydrone, semiquinone, and quinone oxidation products obtained upon oxidation of said salts of said naphthol; and (e) mixtures thereof.

2. A drilling fluid according to claim 1 wherein said additive is present in said drilling fluid in an amount within the range of from 0.05 to 10 pounds per barrel of said fluid.

3. A drilling fluid in accordance with claim 1 wherein the oxidation product is a mixture obtained by contacting an aqueous medium containing at least one of said naphthol, and said salts of said naphthol with an oxygen containing gas.

4. A drilling fluid in accordance with claim 3 wherein said oxidation product is obtained by contacting said aqueous medium with air.

5. A water-base drilling fluid according to claim 1 wherein said additive is an oxidation product of the sodium salt of 6,7-dihydroxy-2-naphthalenesulfonic acid obtained by contacting an aqueous medium containing said salt with an oxygen-containing gas.

6. A water base drilling fluid comprising an alkaline aqueous phase having dispersed therein clay solids and containing a compound selected from the group consisting of a dihydroxynaphthalene sulfonic acid compound, the corresponding quinone derived therefrom and mixtures thereof, said dihydroxynaphthalene sulfonic acid compound having the formula

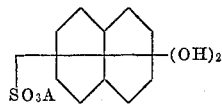

wherein A represents a member selected from the group consisting of hydrogen, ammonium, an alkali metal and an alkaline earth metal, and wherein the hydroxyl substituents are in adjacent positions to each other on the same ring and the sulfonic acid substituent is on either ring of the naphthalene nucleus, said compound being present in an amount within the range of about 0.05 to about 5 pounds per barrel of said drilling fluid.

7. A water-base well drilling fluid comprising: sufficient water to maintain the mixture fluid; sufficient suspended solids to form a filter cake on the wall of the well; a sufficient amount of an alkali metal hydroxide to maintain the drilling fluid alkaline; and a small but effective amount, sufficient to maintain the viscosity of the drilling fluid low enough that it can be circulated, of 6,7-dihydroxy-2-naphthalenesulfonic acid.

8. A water-base well drilling fluid comprising: sufficient water to maintain the mixture fluid; sufficient clayey material to form a filter cake on the wall of the well; a sufficient amount of an alkali metal hydroxide to maintain the drilling fluid alkaline; and a small but effective amount, sufficient to maintain the viscosity of the drilling fluid low enough that it can be circulated, of the sodium salt of 6,7-dihydroxy-2-naphthalenesulfonic acid.

9. A water-base well drilling fluid comprising: sufficient water to maintain the mixture fluid; sufficient clayey material to form a filter cake on the wall of the well; a sufficient amount of sodium hydroxide to maintain the pH of the drilling fluid above about 9; and from 0.05 to 10 pounds per barrel of the sodium salt of 6,7-dihydroxy-2-naphthalenesulfonic acid.

10. In a process for the drilling of a well with well drilling tools wherein a drilling fluid is circulated into and out of said well in contact with the walls thereof, the improvement comprising: circulating in said well as said drilling fluid a water-base drilling fluid comprising water, sufficient suspended solids to form a filter cake on the wall of the well, a sufficient amount of an alkali metal hydroxide to maintain the drilling fluid alkaline, and a small but effective amount, sufficient to maintain the viscosity of the drilling fluid low enough that it can be circulated, of an additive selected from the group consisting of (a) a sulfonated polyhydric naphthol, capable of being oxidized to a quinone, and having the formula

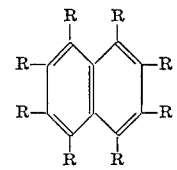

wherein: each R substituent is selected from the group consisting of a hydrogen atom, —OH, —SO$_3$H, and —COOH radicals, and alkyl groups containing from 1 to 18 carbon atoms; at least two and not more than four R substituents are —OH radicals with at least two of said —OH radicals being in positions which will permit the formation of a quinone upon oxidation of the compound; at least one and not more than three R substituents is —SO$_3$H; not more than three R substituents are —COOH; and the total number of carbon atoms in said alkyl groups is not more than 24;

(b) quinhydrone, semiquinone, and quinone oxidation products obtained upon oxidation of said naphthol;

(c) the ammonium, the alkali metal, and the alkaline earth metal salts of said naphthol;

(d) quinhydrone, semiquinone, and quinone oxidation products obtained upon oxidation of said salts of said naphthol; and (e) mixtures thereof.

11. A process according to claim 10 wherein said additive is present in said well drilling fluid in an amount within the range of from 0.05 to 10 pounds per barrel of said fluid.

12. A process according to claim 10 wherein said additive is an oxidation product of the sodium salt of 6,7-dihydroxy-2-naphthalenesulfonic acid obtained by contacting an aqueous medium containing said salt with an oxygen-containing gas.

13. A process according to claim 10 wherein the oxidation product additive in said drilling fluid is a mixture obtained by contacting an aqueous medium containing at least one of said phenol, said salts of said phenol, said naphthol, and said salts of said naphthol with an oxygen containing gas.

14. A process in accordance with claim 13 wherein said oxidation product is obtained by contacting said aqueous medium with air.

15. In a process for the drilling of a well with well drilling tools wherein a drilling fluid is circulated into and out of said well in contact with the walls thereof, the improvement comprising: circulating in said well as said drilling fluid a water-base drilling fluid comprising sufficient water to maintain the mixture fluid; sufficient suspended solids to form a filter cake on the wall of the well; a sufficient amount of an alkali metal hydroxide to maintain the drilling fluid alkaline; and a small but effective amount, sufficient to maintain the viscosity of the drilling fluid low enough that it can be circulated, of 6,7-dihydroxy-2-naphthalenesulfonic acid.

16. In a process for the drilling of a well with well drilling tools wherein a drilling fluid is circulated into and out of said well, in contact with the walls thereof, the improvement comprising: circulating in said well as said drilling fluid a water-base drilling fluid comprising sufficient water to maintain the mixture fluid, sufficient clayey material to form a filter cake on the wall of the well; a sufficient amount of an alkali metal hydroxide to maintain the drilling fluid alkaline; and a small but effective amount, sufficient to maintain the viscosity of the drilling fluid low enough that it can be circulated, of the sodium salt of 6,7-dihydroxy-2-naphthalenesulfonic acid.

17. In a process for the drilling of a well with well drilling tools wherein a drilling fluid is circulated into and out of said well in contact with the walls thereof, the improvement comprising: circulating in said well as said drilling fluid a water-base drilling fluid comprising sufficient water to maintain the mixture fluid; sufficient clayey material to form a filter cake on the wall of the well; a sufficient amount of sodium hydroxide to maintain the pH of the drilling fluid above about 9; and from 0.05 to 10 pounds per barrel of the sodium salt of 6,7-dihydroxy-2-naphthalenesulfonic acid.

References Cited

UNITED STATES PATENTS

| 1,999,766 | 8/1935 | Lawton et al. | 252—8.5 |
| 2,331,281 | 10/1943 | Wayne | 252—8.5 |
| 2,333,133 | 11/1943 | Wayne | 252—8.5 |
| 2,831,022 | 4/1958 | Van Blaricom | 252—8.5 |

OTHER REFERENCES

Tishchenkd et al.: Organic Viscosity Reducers in Clay Solutions, article in Zhur. Priklad, Khim., vol. 35, effective date May 1962, pp. 638 to 646.

Chemical Abstracts, vol. 57, July 1962, col. 2491.

HERBERT B. GUYNN, Primary Examiner

U.S. Cl. X.R.

252—353

UNITED STATES PATENT OFFICE

CERTIFICATE OF CORRECTION

Patent No. 3,558,487                                                    Dated January Charles A. Stratton It is certified that error appears in the above-identified patent and that said Letters Patent are hereby corrected as shown below:

Column 11, line 9, delete "said phenol, said salts of said phenol,".

Signed and sealed this 3rd day of August 1971.

(SEAL)
Attest:

EDWARD M. FLETCHER, JR.                                WILLIAM E. SCHUYLER, JR.
Attesting Officer                                         Commissioner of Patents